United States Patent
Miki et al.

(10) Patent No.: US 11,827,291 B2
(45) Date of Patent: Nov. 28, 2023

(54) MOTOR CONTROL DEVICE, ELECTRIC ACTUATOR PRODUCT, AND ELECTRIC POWER STEERING DEVICE

(71) Applicant: NSK LTD., Tokyo (JP)

(72) Inventors: Yasutoshi Miki, Maebashi (JP); Masahiro Maeda, Maebashi (JP)

(73) Assignee: NSK LTD., Tokyo (JP)

( * ) Notice: Subject to any disclaimer, the term of this patent is extended or adjusted under 35 U.S.C. 154(b) by 484 days.

(21) Appl. No.: 17/281,083

(22) PCT Filed: Oct. 2, 2020

(86) PCT No.: PCT/JP2020/037600
§ 371 (c)(1),
(2) Date: Mar. 29, 2021

(87) PCT Pub. No.: WO2021/106373
PCT Pub. Date: Jun. 3, 2021

(65) Prior Publication Data
US 2022/0306186 A1   Sep. 29, 2022

(30) Foreign Application Priority Data
Nov. 26, 2019  (JP) ................................. 2019-213627

(51) Int. Cl.
*B62D 5/04* (2006.01)
*H02P 27/08* (2006.01)
(Continued)

(52) U.S. Cl.
CPC ........... *B62D 5/046* (2013.01); *B62D 5/0409* (2013.01); *H02P 21/05* (2013.01); *H02P 21/22* (2016.02); *H02P 27/08* (2013.01)

(58) Field of Classification Search
CPC ......... B62D 5/046; B62D 5/0409; H02P 6/10; H02P 21/22
See application file for complete search history.

(56) References Cited

U.S. PATENT DOCUMENTS

| 11,101,756 B2 | 8/2021 | Takase et al. |
| 2003/0057913 A1 | 3/2003 | Matsushita et al. |
(Continued)

FOREIGN PATENT DOCUMENTS

| EP | 3 460 986 A1 | 3/2019 |
| JP | 3480843 B2 | 12/2003 |
(Continued)

OTHER PUBLICATIONS

International Preliminary Report on Patentability dated May 17, 2022 in International Application No. PCT/JP2020/037600.
(Continued)

*Primary Examiner* — Cortez M Cook
(74) *Attorney, Agent, or Firm* — Sughrue Mion, PLLC

(57) ABSTRACT

A motor control device includes a third harmonic calculation unit configured to calculate a first third harmonic on a basis of an average value between a voltage command value of a maximum phase with a maximum duty ratio and a voltage command value of a minimum phase with a minimum duty ratio among three-phase voltage command values; an amplitude calculation unit configured to calculate an amplitude of the three-phase voltage command values; a third harmonic conversion unit configured to convert the first third harmonic into a second third harmonic on a basis of the first third harmonic and the amplitude; a correction unit configured to correct the three-phase voltage command values by subtracting the second third harmonic from the three-phase voltage command values.

9 Claims, 11 Drawing Sheets

(51) Int. Cl.
*H02P 21/22* (2016.01)
*H02P 21/05* (2006.01)

(56) References Cited

U.S. PATENT DOCUMENTS

| | | |
|---|---|---|
| 2013/0328398 A1 | 12/2013 | Kanao et al. |
| 2016/0226408 A1 | 8/2016 | Yamakawa et al. |
| 2018/0138845 A1* | 5/2018 | Tamura ............... H02P 6/10 |
| 2018/0219506 A1 | 8/2018 | Mori et al. |
| 2019/0252972 A1* | 8/2019 | Minaki ............... B62D 5/046 |
| 2020/0382032 A1 | 12/2020 | Takase et al. |

FOREIGN PATENT DOCUMENTS

| | | |
|---|---|---|
| JP | 2004-120853 A | 4/2004 |
| JP | 2006-254532 A | 9/2006 |
| JP | 2009-124799 A | 6/2009 |
| JP | 5532904 B2 | 6/2014 |
| WO | 2017/064756 A1 | 4/2017 |
| WO | 2019/151200 A1 | 8/2019 |

OTHER PUBLICATIONS

Communication dated Mar. 1, 2022 from the Japanese Patent Office in Application No. 2021-504474.
International Search Report of PCT/JP2020/037600 dated Dec. 22, 2020 [PCT/ISA/210].
Written Opinion of PCT/JP2020/037600 dated Dec. 22, 2020 [PCT/ISA/237].
Communication dated Nov. 25, 2021 from the European Patent Office in European Application No. 20870445.2.
Communication dated Dec. 7, 2021 from the European Patent Office in European Application No. 20870445.2.

* cited by examiner

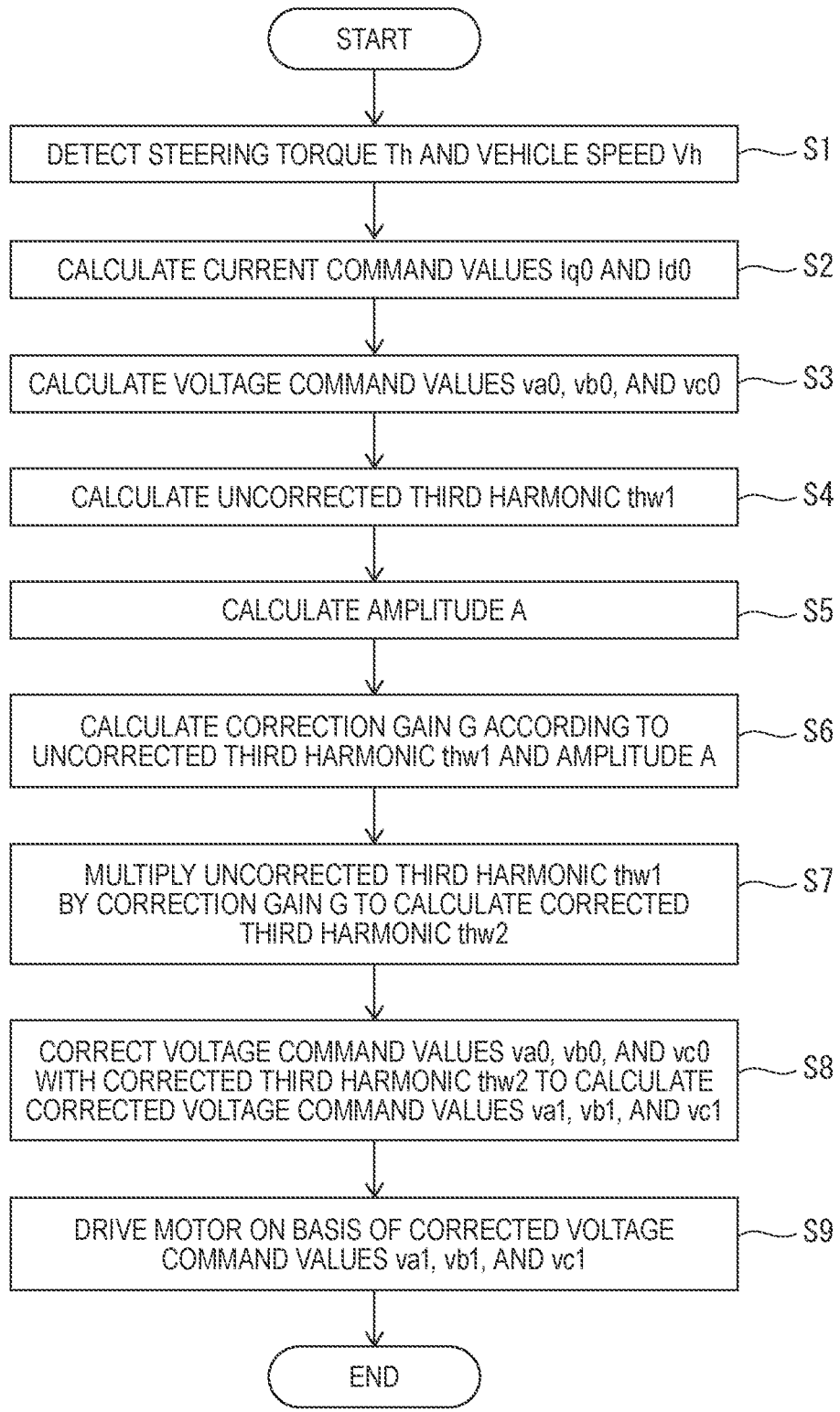

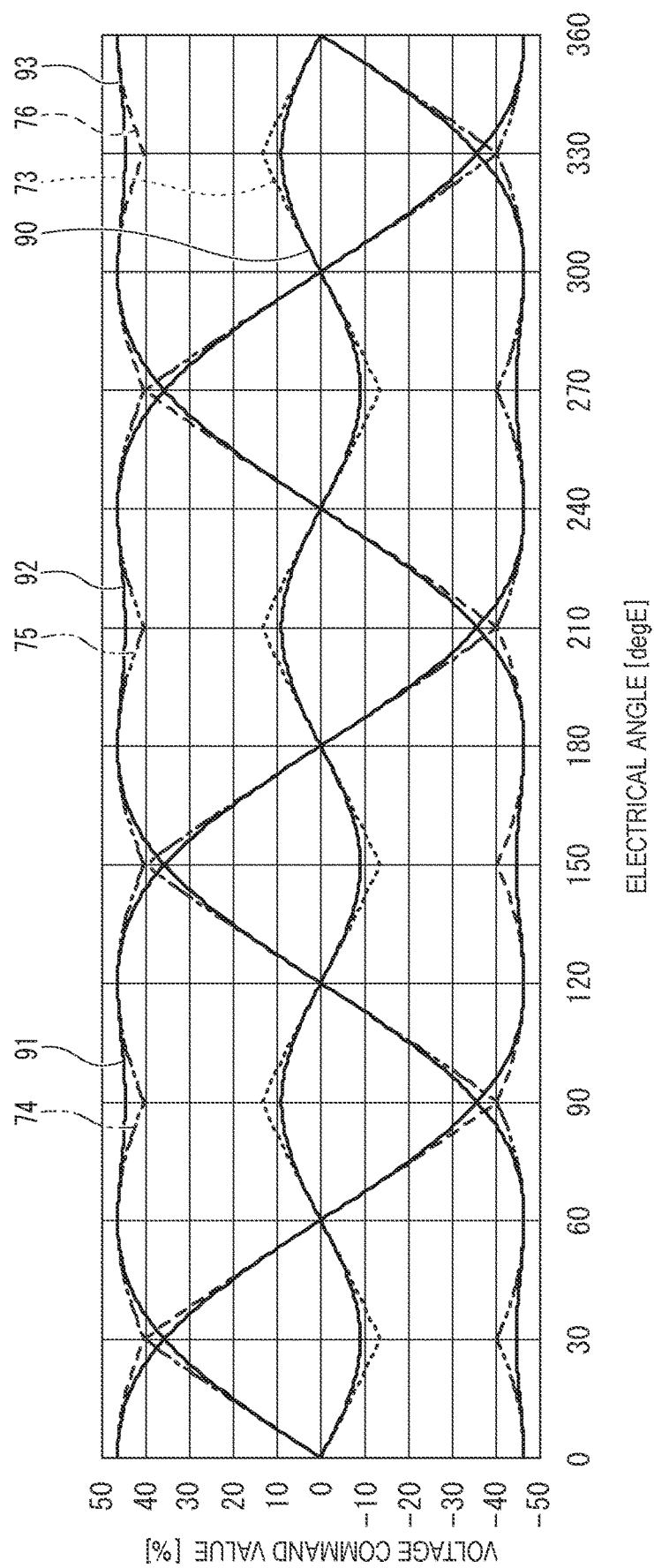

MOTOR CONTROL DEVICE, ELECTRIC ACTUATOR PRODUCT, AND ELECTRIC POWER STEERING DEVICE

CROSS REFERENCE TO RELATED APPLICATIONS

This application is a National Stage of International Application No. PCT/JP2020/037600, filed Oct. 2, 2020, claiming priority to Japanese Patent Application No. 2019-213627, filed Nov. 26, 2019.

TECHNICAL FIELD

The present invention relates to a motor control device that controls a three-phase motor and an electric actuator product and an electric power steering device that include the three-phase motor controlled by the motor control device.

BACKGROUND ART

There are known technologies for superimposing a third harmonic on three-phase voltage command values to improve the effective utilization ratio of an applied voltage to be applied to a three-phase motor.

A technology of PTL 1 below calculates, as a third harmonic, an average value between a voltage command value of a maximum phase with a maximum duty ratio and a voltage command value of a minimum phase with a minimum duty ratio among three-phase voltage command values, and superimposes it on the three-phase voltage command values.

A technology of PTL 2 below synthesizes amounts by which three-phase voltage command values exceed $\sqrt{3}/2$ times an amplitude thereof in each phase to generate a third harmonic, and superimposes it on the three-phase voltage command values.

CITATION LIST

Patent Literature

PTL 1: JP Pat. No. 3480843
PTL 2: JP Pat. No. 5532904

SUMMARY OF INVENTION

Technical Problem

As in PTL 1 described above, when the average value between the voltage command values of the maximum phase and the minimum phase among the three-phase voltage command values is superimposed as the third harmonic on the three-phase voltage command values, noise may be generated due to an abrupt change point that occurs in waveforms after the superimposition.

The present invention has been made focusing on the above problem, and it is an object of the present invention to, in a motor control device configured to calculate a third harmonic to be superimposed on three-phase voltage command values to improve voltage utilization ratio according to an average value between voltage command values of a maximum phase and a minimum phase among the three-phase voltage command values, correct the third harmonic so that an abrupt change point that occurs in waveforms after superimposing the third harmonic is mitigated.

Solution to Problem

To achieve the above object, according to an aspect of the present invention, there is provided a motor control device including: a voltage command value calculation unit configured to calculate three-phase voltage command values to be applied to a three-phase motor; a third harmonic calculation unit configured to calculate a first third harmonic on a basis of an average value between a voltage command value of a maximum phase with a maximum duty ratio and a voltage command value of a minimum phase with a minimum duty ratio among the three-phase voltage command values; an amplitude calculation unit configured to calculate an amplitude of the three-phase voltage command values; a third harmonic conversion unit configured to convert the first third harmonic into a second third harmonic on a basis of the first third harmonic and the amplitude; a correction unit configured to correct the three-phase voltage command values by subtracting the second third harmonic from the three-phase voltage command values; and a drive circuit configured to drive the three-phase motor on a basis of the corrected three-phase voltage command values.

According to another aspect of the present invention, there is provided an electric actuator product including the motor control device described above and the three-phase motor controlled by the motor control device.

According to still another aspect of the present invention, there is provided an electric power steering device including the motor control device described above and the three-phase motor controlled by the motor control device, the three-phase motor applying a steering assist force to a steering system of a vehicle.

Advantageous Effects of Invention

According to the present invention, in a motor control device configured to calculate a third harmonic to be superimposed on three-phase voltage command values to improve voltage utilization ratio according to an average value between voltage command values of a maximum phase and a minimum phase among the three-phase voltage command values, it is possible to correct the third harmonic so that an abrupt change point that occurs in waveforms after superimposing the third harmonic is mitigated.

BRIEF DESCRIPTION OF DRAWINGS

FIG. 9 is a flowchart of an example of a motor control method of the first embodiment; and FIG. 10 is an illustrative diagram of a corrected third harmonic in a second embodiment.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Structure)

Figure 1:
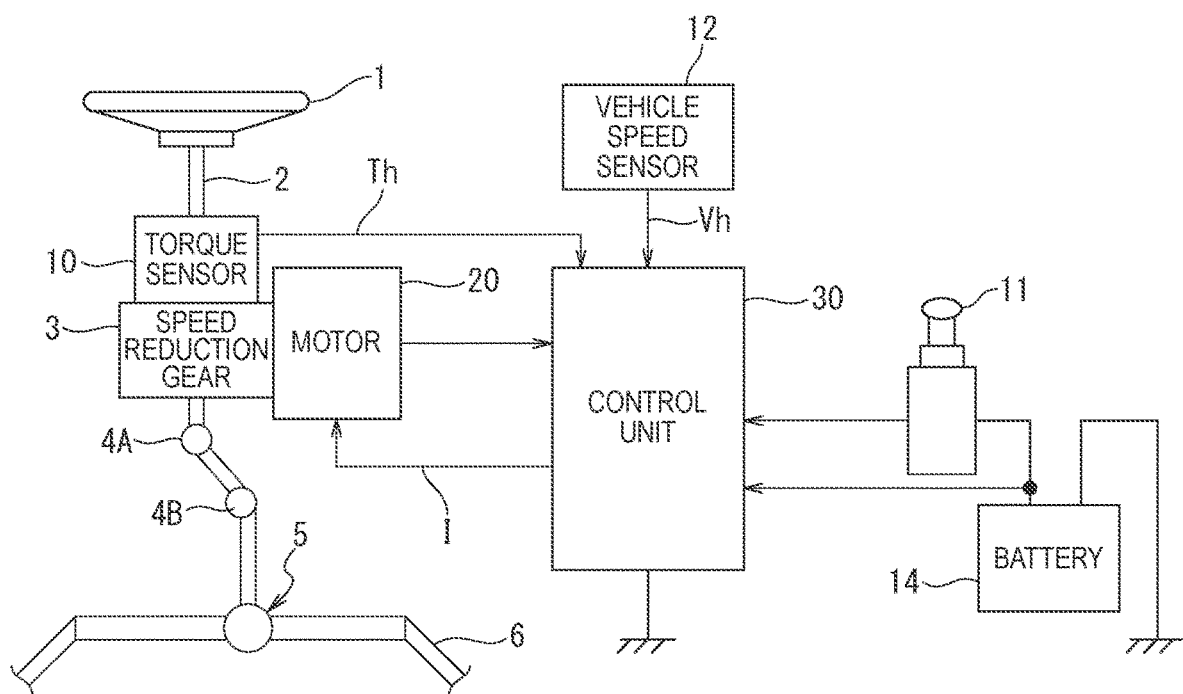
FIG. 1 is a structural diagram illustrating an overview of an example of an electric power steering device according to an embodiment.

FIG. 1 illustrates the structural example of an electric power steering device of an embodiment. A steering shaft (steering wheel shaft) 2 of a steering wheel 1 is connected to tie rods 6 of steered wheels via a speed reduction gear 3, universal joints 4A and 4B, and a pinion rack mechanism 5. The steering shaft 2 is provided with a torque sensor 10 configured to detect a steering torque of the steering wheel 1, and a three-phase motor 20 configured to assist a steering force of the steering wheel 1 is connected to the steering shaft 2 via the speed reduction gear 3.

A control unit (ECU) 30 configured to control the power steering device receives electrical power from a battery 14 serving as a power supply, and also receives an ignition key signal from an ignition key 11. On the basis of a steering torque Th detected by the torque sensor 10 and a vehicle speed Vh detected by a vehicle speed sensor 12, the control unit 30 calculates a steering assist command value of an assist command using an assist map and the like, and controls a current I to be supplied to the three-phase motor 20 on the basis of the calculated steering assist command value.

In the electric power steering device having such a structure, the steering torque Th applied by steering wheel operation of the driver transmitted from the steering wheel 1 is detected by the torque sensor 10. The three-phase motor 20 is driven-controlled by the steering assist command value calculated on the basis of the detected steering torque Th and vehicle speed Vh, and the drive is applied as an assist force (a steering assist force) for the steering wheel operation of the driver to a steering system, whereby the driver can perform the steering wheel operation with light force. In other words, the steering assist command value is calculated from the steering torque Th output by the steering wheel operation and the vehicle speed Vh, and depending on how to control the three-phase motor 20 on the basis of the steering assist command value, it is determined how good or bad the feeling in the steering wheel operation is, so that performance of the electric power steering device is significantly affected.

The control unit 30 may include, for example, a computer including a processor and peripheral components such as a storage device. The processor may be, for example, a central processing unit (CPU) or a micro-processing unit (MPU).

The storage device may include any of a semiconductor storage device, a magnetic storage device, and an optical storage device. The storage device may include memories, such as register, cache memory, and read only memory (ROM) and random access memory (RAM) used as primary memory.

Note that the control unit 30 may be formed by dedicated hardware for executing each information processing that will be described below.

For example, the control unit 30 may include a functional logic circuit set in a general-purpose semiconductor integrated circuit. For example, the control unit 30 may include a programmable logic device (PLD) such as a field-programmable gate array (FPGA), or the like.

An example of the functional structure of the control unit 30 will be described with reference to FIG. 2. The control unit 30 includes a current command value calculation unit 40, subtractors 41 and 42, a proportional-integral (PI) control unit 43, a two-phase/three-phase conversion unit 44, a command value correction unit 45, a PWM control unit 46, an inverter 47, a three-phase/two-phase conversion unit 48, and an angular velocity conversion unit 49, and drives the three-phase motor 20 with vector control. Note that the attached drawing illustrates the inverter as "INV".

Functions of the current command value calculation unit 40, the subtractors 41 and 42, the PI control unit 43, the two-phase/three-phase conversion unit 44, the command value correction unit 45, the PWM control unit 46, the inverter 47, the three-phase/two-phase conversion unit 48, and the angular velocity conversion unit 49 are realized, for example, by allowing the processor of the control unit 30 to execute a computer program stored in the storage device.

The current command value calculation unit 40 calculates a q-axis current command value Iq0 and a d-axis current command value Id0 to be caused to flow through the three-phase motor 20 on the basis of the steering torque Th, the vehicle speed Vh, a motor angle (rotation angle) θ of the three-phase motor 20, and a rotational angular velocity ω of the three-phase motor 20.

On the other hand, motor currents ia, ib, and ic, respectively, of the three-phase motor 20 are detected by current sensors 50, 51, and 52. The detected motor currents ia, ib, and ic are converted to currents id and iq of d-q two axes by the three-phase/two-phase conversion unit 48.

The subtractors 41 and 42 subtract the fed-back currents iq and id, respectively, from the q-axis current command value Iq0 and the d-axis current command value Id0 to calculate a q-axis deviation current Δq and a d-axis deviation current Δd. The q-axis deviation current Δq and the d-axis deviation current Δd are input to the PI control unit 43.

The PI control unit 43 calculates voltage command values vq and vd such that the q-axis deviation current Δq and the d-axis deviation current Δd, respectively, become zero. The two-phase/three-phase conversion unit 44 converts the voltage command values vd and vq to an A phase voltage command value va0, a B phase voltage command value vb0, and a C phase voltage command value vc0, respectively, of the three-phase motor 20.

Hereinafter, the A phase voltage command value va0, the B phase voltage command value vb0, and the C phase voltage command value vc0 may be collectively referred to as "three-phase voltage command values".

The command value correction unit 45 corrects the three-phase voltage command values va0, vb0, and vc0 to improve voltage utilization ratio, and outputs corrected three-phase voltage command values va1, vb1, and vc1. Details of the structure and operation of the command value correction unit 45 will be described later. Hereinafter, the three-phase voltage command values va1, vb1, and vc1 may be referred to as "corrected three-phase voltage command values va1, vb1, and vc1".

The PWM control unit 46 generates PWM-controlled gate signals on the basis of the corrected three-phase voltage command values va1, vb1, and vc1.

The inverter 47 is driven by the gate signals generated by the PWM control unit 46, and supplies a current such that the q-axis deviation current Δq and the d-axis deviation current Δd become 0 to the three-phase motor 20.

A rotation angle sensor 53 (for example, a resolver) detects the motor angle (rotation angle) θ of the three-phase motor 20. The angular velocity conversion unit 49 calculates the rotational angular velocity ω of the three-phase motor 20 on the basis of temporal changes of the motor angle θ. The motor angle θ and the rotational angular velocity ω are input to the current command value calculation unit 40, and used for vector control.

Next, an example of the functional structure of the command value correction unit 45 will be described with reference to FIG. 3A. The command value correction unit 45 includes a third harmonic calculation unit 60 configured to calculate a third harmonic for improving the voltage utilization ratio.

The third harmonic calculation unit 60 calculates a third harmonic thw1 on the basis of an average value between a voltage command value of a maximum phase with a maximum duty ratio and a voltage command value of a minimum phase with a minimum duty ratio among the three-phase voltage command values va0, vb0, and vc0.

An example of the functional structure of the third harmonic calculation unit 60 will be described with reference to FIG. 3B. The third harmonic calculation unit 60 includes a maximum value selection unit 60a, a minimum value selection unit 60b, and an averaging unit 60c.

The maximum value selection unit 60a selects a maximum value Max (va0, vb0, or vc0) among the three-phase voltage command values va0, vb0, and vc0. The maximum value Max (va0, vb0, or vc0) is the voltage command value of a maximum phase with a maximum duty ratio among the A phase, the B phase, and the C phase.

The minimum value selection unit 60b selects a minimum value Min (va0, vb0, or vc0) among the three-phase voltage command values va0, vb0, and vc0. The minimum value Min (va0, vb0, or vc0) is the voltage command value of a minimum phase with a minimum duty ratio among the A phase, the B phase, and the C phase.

The averaging unit 60c outputs an average value between the maximum value Max (va0, vb0, or vc0) and the minimum value Min (va0, vb0, or vc0) as the third harmonic thw1.

Now, assume a case where, in order to improve the voltage utilization ratio, the third harmonic thw1 is superimposed on the three-phase voltage command values va0, vb0, and vc0 (specifically, the third harmonic thw1 is subtracted from the three-phase voltage command values va0, vb0, and vc0) to correct the three-phase command values va0, vb0, and vc0.

Figure 4:
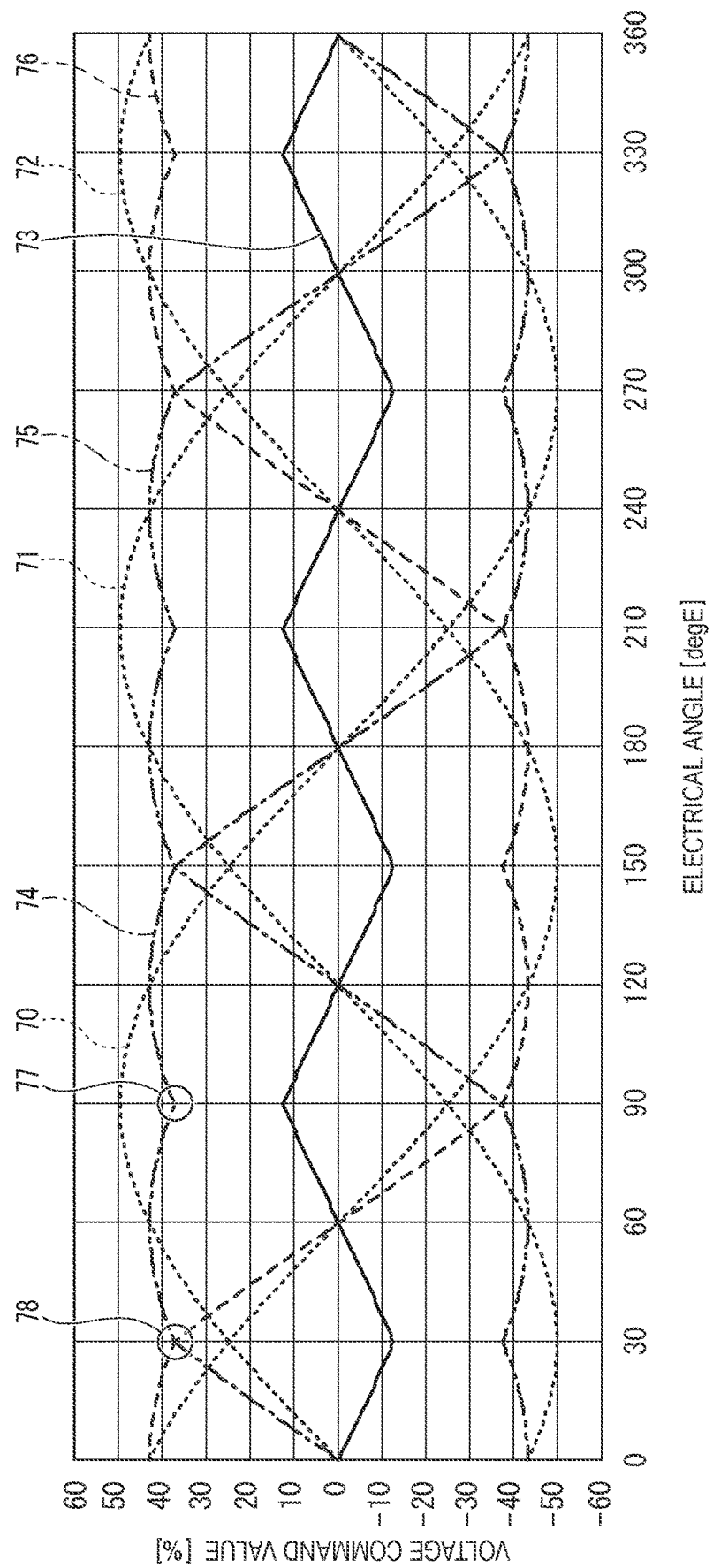
FIG. 4 is an illustrative diagram of waveforms of three-phase voltage command values when corrected with a third harmonic calculated by the third harmonic calculation unit.

Reference will be made to FIG. 4. Dotted lines 70, 71, and 72, respectively, indicate waveforms of the uncorrected A phase, B phase, and C phase voltage command values va0, vb0, and vc0. A solid line 73 indicates a waveform of the third harmonic thw1. A dashed and dotted line 74, a dashed and double dotted line 75, and a broken line 76 indicate waveforms of three-phase voltage command values of the A phase, the B phase, and the C phase after correction obtained by superimposing the third harmonic thw1 on the three-phase voltage command values va0, vb0, and vc0.

As illustrated, in the waveform 74 of the voltage command value of the A phase after correction, there occurs an abrupt change point as indicated by reference sign 77. The same is true for the waveforms 75 and 76 of the voltage command values of the B phase and the C phase. Such an abrupt change point causes noise.

Furthermore, as indicated by reference sign 78, a duty ratio at a point where waveforms of the voltage command values of two phases (for example, the A phase and the C phase) among the three phases intersect increases. Thus, when the duty ratios of the two phases increase simultaneously, it may be difficult to perform current detection using a downstream shunt system.

Then, the command value correction unit 45 of the embodiment corrects the third harmonic thw1 to mitigate the occurrence of such an abrupt change point 77 or reduce the duty ratio at the point 78 where the waveforms of the voltage command values of the two phases intersect.

Figure 5:
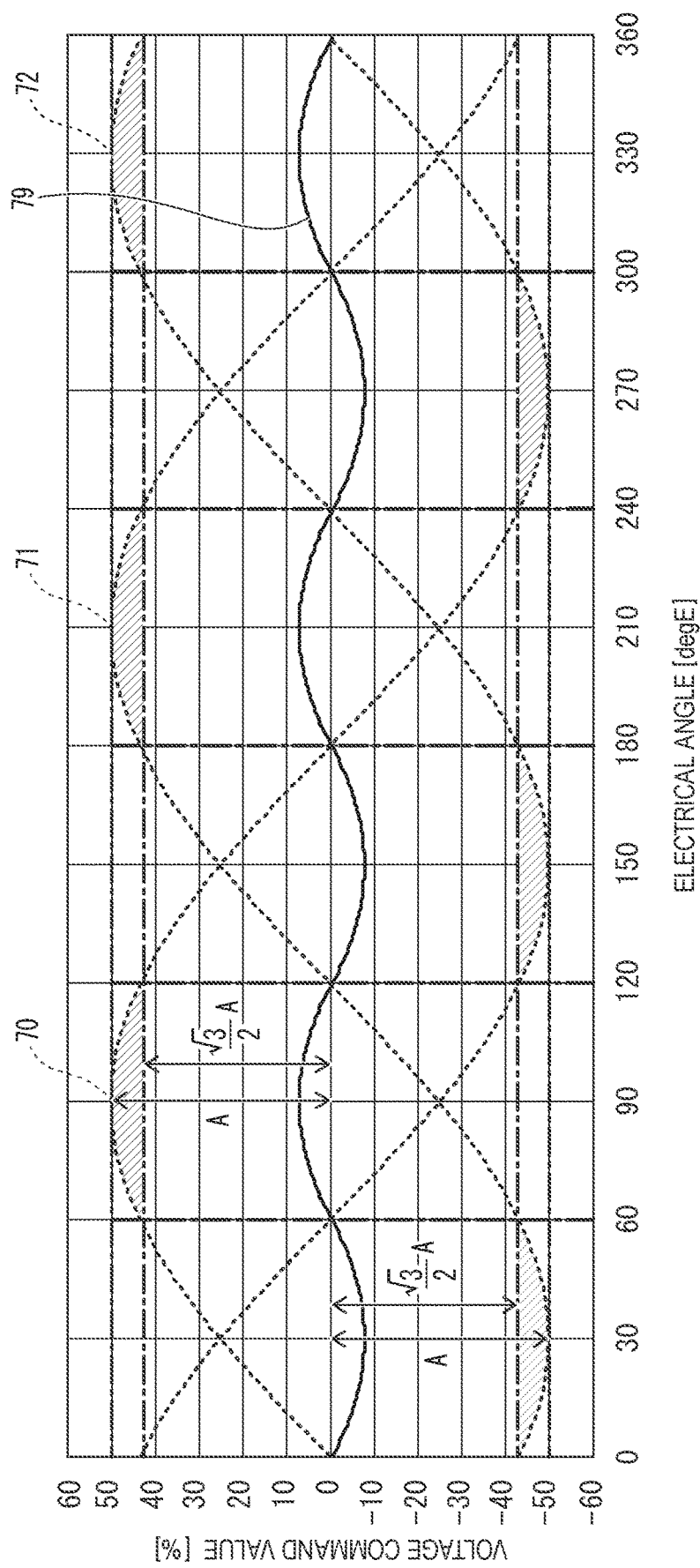
FIG. 5 is an illustrative diagram of a corrected third harmonic obtained by correcting the third harmonic calculated by the third harmonic calculation unit.

Reference will be made to FIG. 5. The command value correction unit 45 of the first embodiment corrects the third harmonic thw1 into a third harmonic thw2 having a waveform of a solid line 79. Hereinafter, the third harmonic thw2 is referred to as "corrected third harmonic thw2".

The hatched ranges indicate amounts by which magnitudes of the A phase, B phase, and C phase voltage command values va0, vb0, and vc0 (the dotted lines 70, 71, and 72), respectively, exceed a value $(A \times \sqrt{3}/2)$ that is $\sqrt{3}/2$ times an amplitude A of the three-phase voltage command values.

As illustrated, the electrical angle ranges where the A phase, B phase, and C phase voltage command values va0, vb0, and vc0 exceed $(A \times \sqrt{3}/2)$ are deviated by 60 degrees each, and the voltage command values will not exceed $(A \times \sqrt{3}/2)$ in plural phases simultaneously.

For example, in electrical angle ranges of from 0 to 60 degrees and from 180 to 240 degrees in FIG. 5, only the B phase voltage command value vb0 (the dotted line 71) exceeds $(A \times \sqrt{3}/2)$. In electrical angle ranges of from 60 to 120 degrees and from 240 to 300 degrees, only the A phase voltage command value va0 (the dotted line 70) exceeds $(A \times \sqrt{3}/2)$, and in electrical angle ranges of from 120 to 180 degrees and from 300 to 360 degrees, only the C phase voltage command value vc0 (the dotted line 72) exceeds $(A \times \sqrt{3}/2)$.

The corrected third harmonic thw2 (the solid line 79) has a waveform equal to a component obtained by synthesizing (or combining) respective amounts by which the voltage command values of the different phases (i.e., the A phase, the B phase, and the C phase) exceed $(A \times \sqrt{3}/2)$ in each of the 60-degree wide electrical angle ranges deviated by the electrical angle of 60 degrees each.

By subtracting such a corrected third harmonic thw2 from the three-phase voltage command values va0, vb0, and vc0, waveforms (i.e., waveform peak portions) of the ranges where the three-phase voltage command values va0, vb0, and vc0 exceed (A×√3/2) can be flattened.

Figure 6:
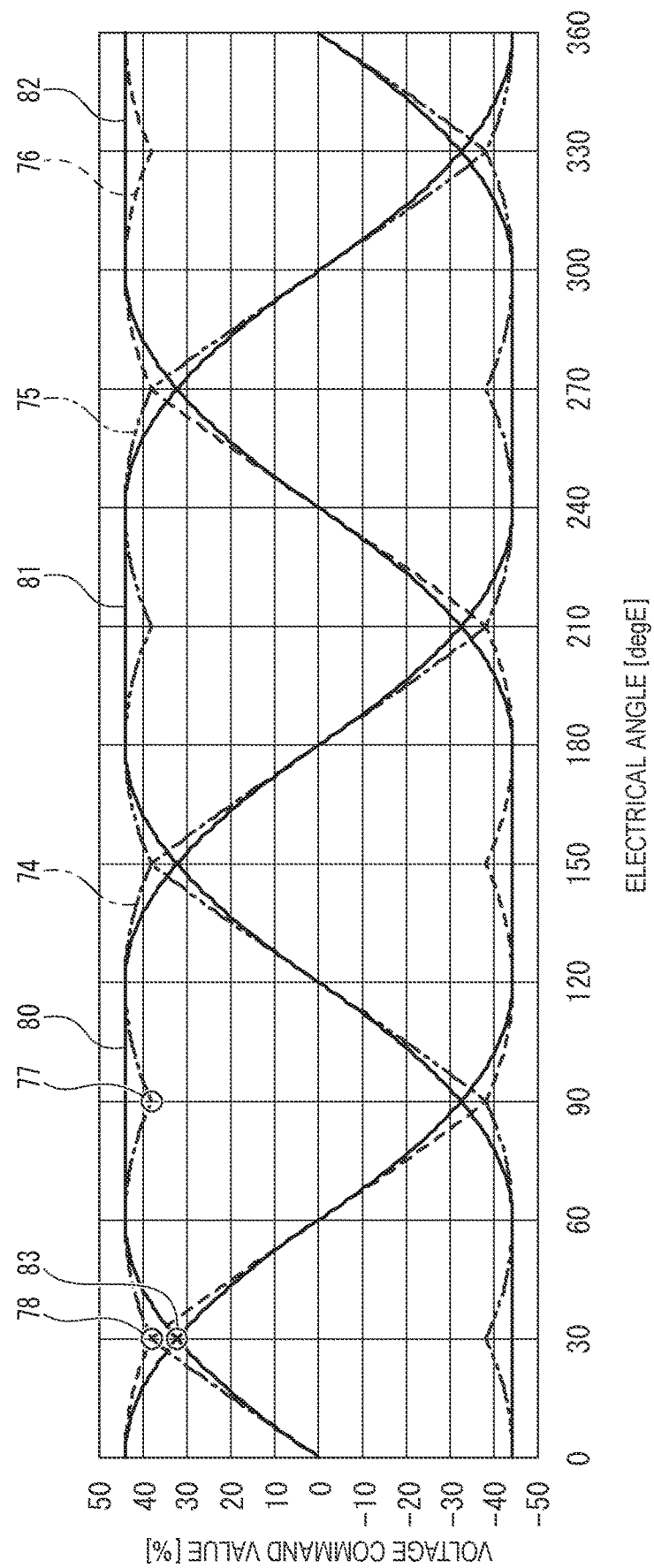
FIG. 6 is a diagram that compares the three-phase voltage command values corrected with the third harmonic calculated by the third harmonic calculation unit and three-phase voltage command values corrected with the corrected third harmonic.

Reference will be made to FIG. 6. Solid lines 80, 81, and 82 indicate waveforms of A phase, B phase, and C phase voltage command values after correction obtained by subtracting the corrected third harmonic thw2 (the solid line 79) from the A phase, B phase, and C phase voltage command values va0, vb0, and vc0 (the dotted lines 70, 71, and 72 of FIG. 5), respectively.

The dashed and dotted line 74, the dashed and double dotted line 75, and the broken line 76 indicate the waveforms of the A phase, B phase, and C phase voltage command values after correction obtained by subtracting the third harmonic thw1 from the three-phase voltage command values va0, vb0, and vc0 of the A phase, the B phase, and the C phase, as in FIG. 4.

Peak portions of waveforms 80, 81, and 82 of the voltage command values corrected with the corrected third harmonic thw2 are flat, and there occurs no abrupt change point (for example, reference sign 77) such that has occurred in the waveforms 74, 75, and 76 of the voltage command values corrected with the third harmonic thw1.

Additionally, among the waveforms 80, 81, and 82 of the voltage command values corrected with the corrected third harmonic thw2, a duty ratio at an intersection between two phases (reference sign 83 exemplifies an intersection between the A phase and the C phase) is reduced more than the duty ratio at the point 78 of the intersection between the waveforms 74 and 76 of the voltage command values corrected with the third harmonic thw1.

Thus, correcting the third harmonic thw1 into the corrected third harmonic thw2 can mitigate the occurrence of an abrupt change point, and can reduce the duty ratio at the point where the waveforms of the voltage command values of the two phases intersect.

Figure 3A:
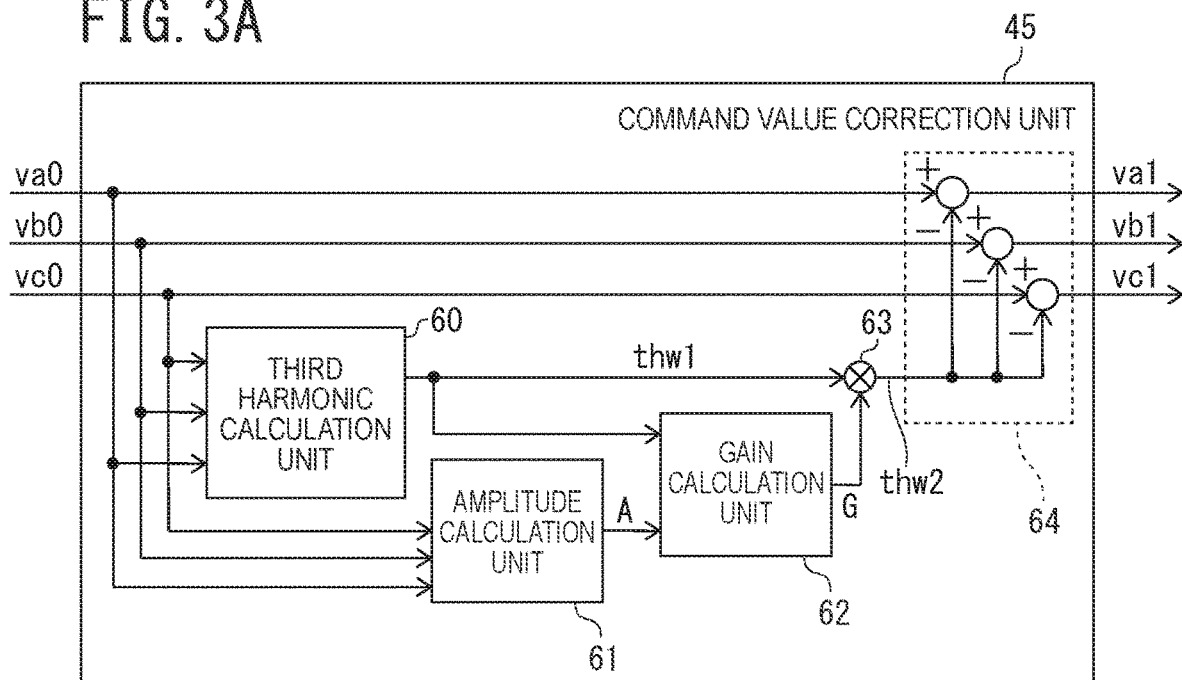
FIG. 3A is a block diagram illustrating an example of the functional structure of a command value correction unit illustrated in FIG. 2.
Figure 3B:
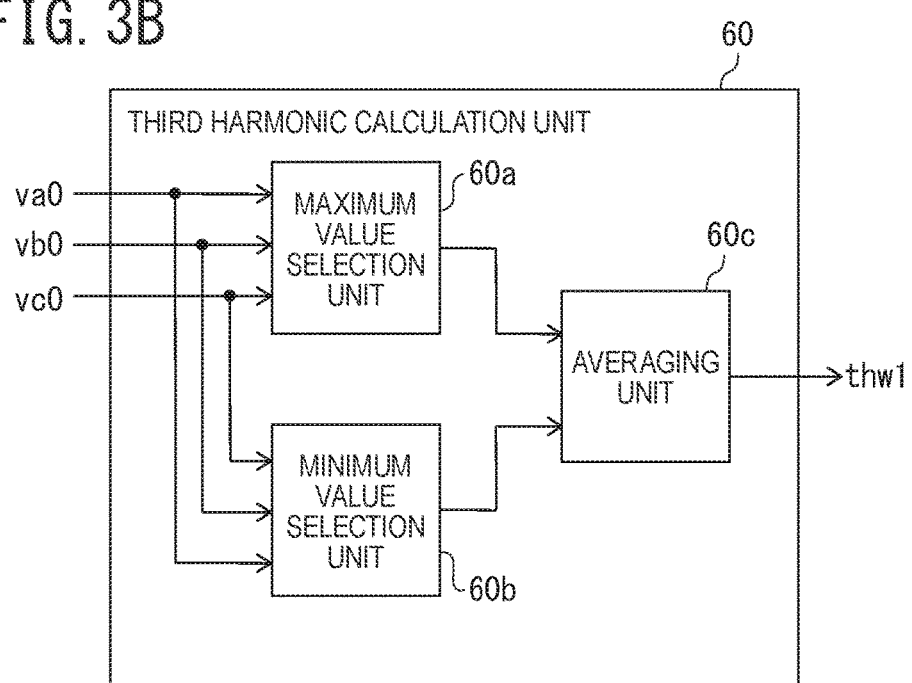
FIG. 3B is a block diagram illustrating an example of the functional structure of a third harmonic calculation unit illustrated in FIG. 3A.

Reference will be made to FIG. 3A. In order to correct the third harmonic thw1 into the corrected third harmonic thw2, the command value correction unit 45 includes an amplitude calculation unit 61, a gain calculation unit 62, and a multiplier 63.

Additionally, the command value correction unit 45 includes a subtractor 64 configured to subtract the corrected third harmonic thw2 from the three-phase voltage command values va0, vb0, and vc0 to calculate corrected three-phase voltage command values va1, vb1, and vc1.

Hereinafter, a description will be given of an overview of a method for calculating the corrected third harmonic thw2 by the amplitude calculation unit 61, the gain calculation unit 62, and the multiplier 63.

In the waveform 73 of the third harmonic thw1 illustrated in FIG. 4 and the waveform 79 of the corrected third harmonic thw2 illustrated in FIG. 5, waveforms in an electrical angle range of from 0 to 30 degrees are focused.

By using the fact that the sum of duties of the three-phase voltage command values va0, vb0, and vc0 is 0, the third harmonic thw1 of the electrical angle range of from 0 to 30 degrees can be represented by equation (1) below.

[Math 1]

$$thw1 = -\frac{A}{2} \times \sin\theta \qquad (1)$$

In equation (1) above, A represents the amplitude of the uncorrected three-phase voltage command values va0, vb0, and vc0, as described above.

On the other hand, the corrected third harmonic thw2 of the electrical angle range of from 0 to 30 degrees is given by equation (2) below.

[Math 2]

$$thw2 = A \times \sin(\theta - 120 \text{ deg}) + A \times \frac{\sqrt{3}}{2} \qquad (2)$$

A correction gain G for correcting the third harmonic thw1 into the corrected third harmonic thw2 can be calculated as a ratio (thw2/thw1) between equations (1) and (2) above by equation (3) below.

[Math 3]

$$G = \frac{thw2}{thw1} = \frac{(\sin\theta + \sqrt{3} \times \cos\theta - \sqrt{3})}{\sin\theta} \qquad (3)$$

When equation (1) above is solved for θ and the result is substituted into equation (3) above, there can be obtained equation (4) below not including the variable θ.

[Math 4]

$$G = \frac{thw2}{thw1} = 1 + \sqrt{3} \times \left(\sqrt{\frac{A^2}{4 \times thw1^2} - 1} - \frac{A}{2 \times thw1}\right) \qquad (4)$$

Equation (4) above shows that the correction gain G is a function of the amplitude A of the three-phase voltage command values va0, vb0, and vc0 and the third harmonic thw1.

The amplitude calculation unit 61 calculates the amplitude A of the three-phase voltage command values va0, vb0, and vc0. The amplitude calculation unit 61 may calculate the amplitude A on the basis of a sum of squares of the three-phase voltage command values va0, vb0, and vc0 according to, for example, equation (5) below.

[Math 5]

$$A = \sqrt{\frac{2}{3}} \sqrt{va0^2 + vb0^2 + vc0^2} \qquad (5)$$

The amplitude calculation unit 61 may calculate the amplitude A on the basis of a sum of squares of the q-axis voltage command value vq and the d-axis voltage command value vd according to, for example, equation (6) below.

[Math 6]

$$A = \sqrt{vd^2 + vq^2} \qquad (6)$$

The gain calculation unit 62 calculates the correction gain G on the basis of the third harmonic thw1 and the amplitude A. The gain calculation unit 62 may obtain the correction gain G by calculating, for example, calculation equation (4) above.

Additionally, the gain calculation unit 62 may calculate, as the correction gain G, a gain proportional to the third harmonic thw1. The reason for that will be described below.

Figure 7:
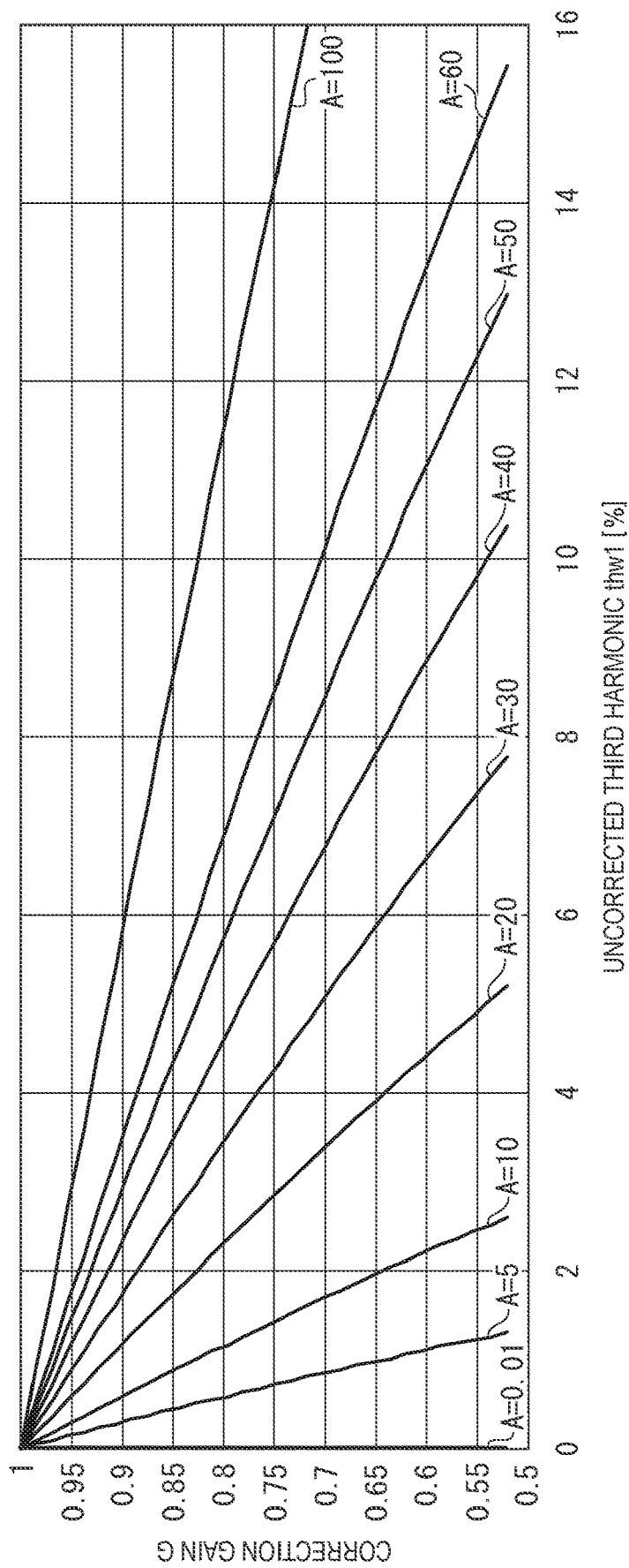
FIG. 7 is an illustrative diagram of a relationship between the third harmonic calculated by the third harmonic calculation unit, an amplitude of the three-phase voltage command values, and a correction gain.

A relationship between the third harmonic thw1, the amplitude A, and the correction gain G will be described with reference to FIG. 7. FIG. 7 is a graph illustrating a relationship between the third harmonic thw1 and the correction gain G when the amplitude A is varied from 0.01% up to 100% of a predetermined amplitude (for example, a maximum amplitude).

As can be seen in FIG. 7, the correction gain G varies substantially linearly with respect to the third harmonic thw1, so that the correction gain G can be approximated as a linear function of the third harmonic thw1. Therefore, the gain calculation unit 62 can calculate a gain proportional to the third harmonic thw1 as the correction gain G.

In addition, when an approximate linear line of each graph in FIG. 7 is calculated and a gradient α=((G change amount ΔG)/(thw1 change amount Δthw1)) and an intercept β of the approximate linear line are calculated, it can be seen that the gradient α is inversely proportional to the amplitude A. In other words, gradient α=constant C/A holds.

Accordingly, by finding the constant C and the intercept β by calculation in advance, equations (7) and (8) for calculating the correction gain G can be obtained.

Gradient α=C/A (7)

Correction gain G=α×|thw1|+intercept β (8)

The calculation equations (7) and (8) are linear approximations that linearly approximate a function that calculates the correction gain G using the third harmonic thw1 as a variable.

Figure 8:
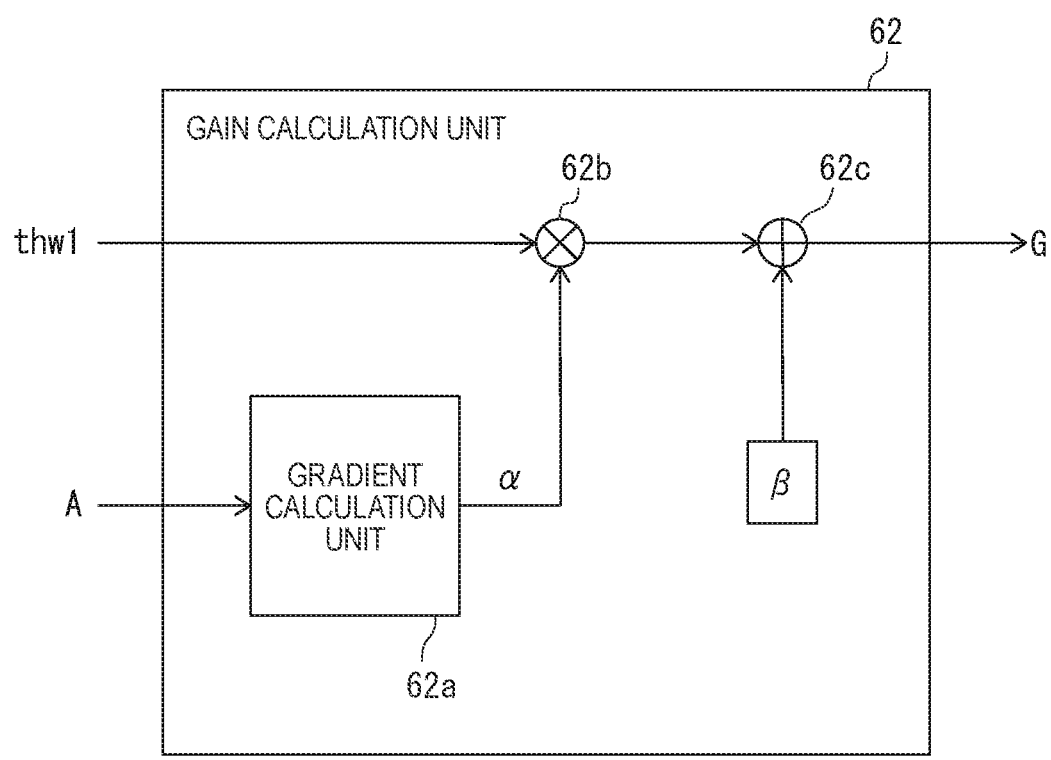
FIG. 8 is a block diagram illustrating an example of the functional structure of a gain calculation unit of a first embodiment.

FIG. 8 is a block diagram illustrating an example of the functional structure of the gain calculation unit 62. The gain calculation unit 62 calculates the correction gain G on the basis of the calculation equations (7) and (8). The gain calculation unit 62 includes a gradient calculation unit 62a, a multiplier 62b, and an adder 62c.

The gradient calculation unit 62a calculates the gradient α on the basis of the amplitude A according to equation (7) above. The multiplier 62b and the adder 62c calculate the correction gain G on the basis of the gradient α and the third harmonic thw1 according to equation (8) above.

Reference will be made to FIG. 3A. The multiplier 63 multiplies the third harmonic thw1 by the correction gain G to calculate the corrected third harmonic thw2. The subtractor 64 subtracts the corrected third harmonic thw2 from the three-phase voltage command values va0, vb0, and vc0 to calculate the corrected three-phase voltage command values va1, vb1, and vc1.

Figure 2:
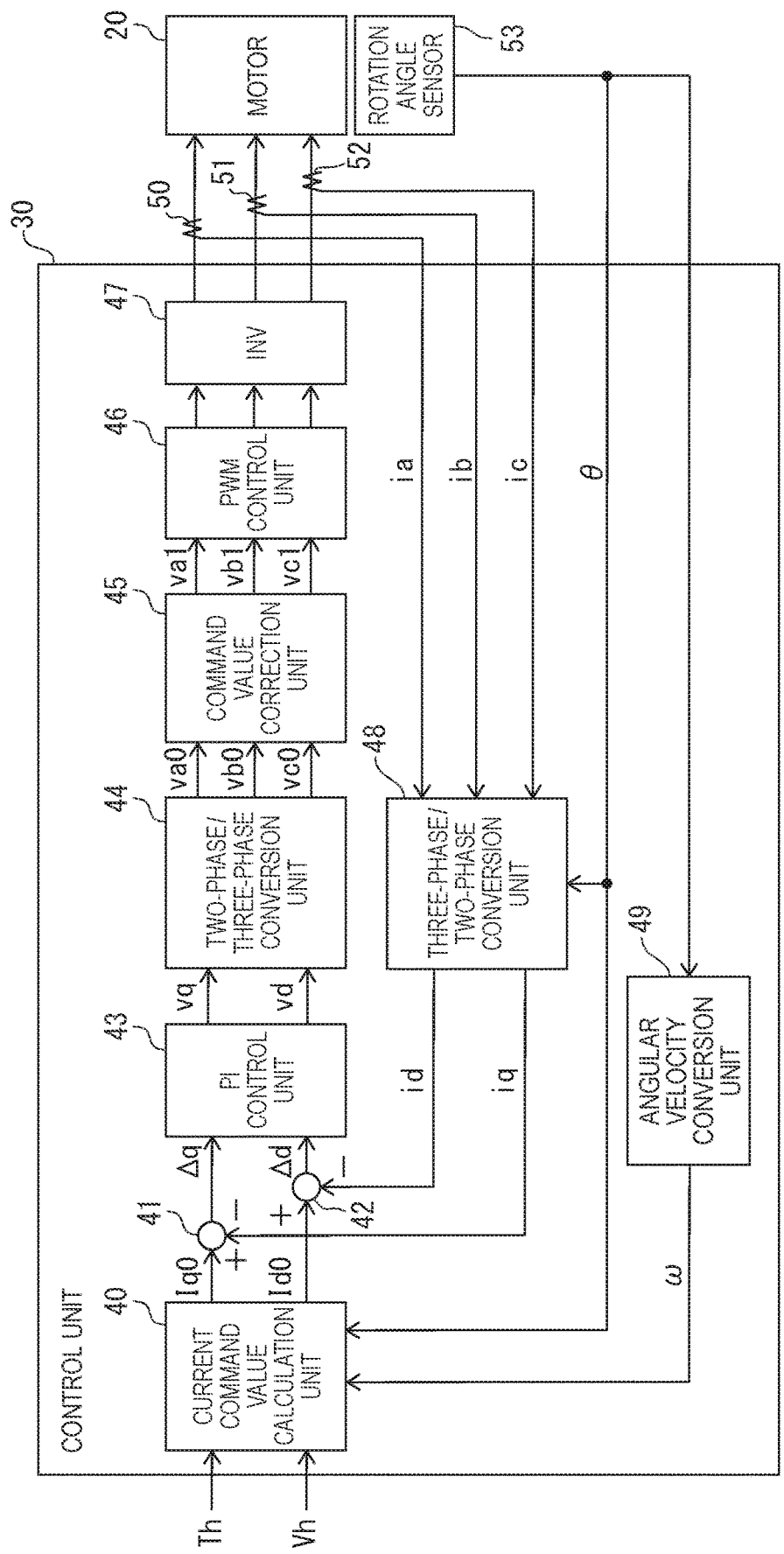
FIG. 2 is a block diagram illustrating an example of the functional structure of a control unit illustrated in FIG. 1.

The PWM control unit 46 of FIG. 2 drives the inverter 47 on the basis of the corrected three-phase voltage command values va1, vb1, and vc1 to supply motor current to the three-phase motor 20.

The control unit 30 is an example of a "motor control device" described in the claims. The current command value calculation unit 40, the subtractors 41 and 42, the PI control unit 43, and the two-phase/three-phase conversion unit 44 are an example of a "voltage command value calculation unit" described in the claims.

The multiplier 63 is an example of a "multiplication unit" described in the claims. The subtractor 64 is an example of a "correction unit" described in the claims. The PWM control unit 46 and the inverter 47 are an example of a "drive circuit" described in the claims.

The gain calculation unit 62 and the multiplier 63 is an example of a "third harmonic conversion unit" described in the claims.

The third harmonic thw1 is an example of a "first third harmonic" described in the claims. The corrected third harmonic thw2 is an example of a "second third harmonic" described in the claims.

(Operation)

A motor control method by the motor control device of the first embodiment will be described with reference to FIG. 9.

At step S1, the torque sensor 10 detects the steering torque Th of the steering wheel 1. The vehicle speed sensor 12 detects the vehicle speed Vh of a vehicle.

At step S2, the current command value calculation unit 40 calculates the q-axis current command value Iq0 and the d-axis current command value Id0 to be caused to flow through the three-phase motor 20 on the basis of at least the steering torque Th and the vehicle speed Vh.

At step S3, the PI control unit 43 calculates the voltage command values vq and vd on the basis of the deviations Δq and Δd between the q-axis current command value Iq0 and the d-axis current command value Id0 and the fed-back motor currents iq and id. The two-phase/three-phase conversion unit 44 converts the voltage command values vd and vq to the three-phase voltage command values va0, vb0, and vc0.

At step S4, the third harmonic calculation unit 60 of the command value correction unit 45 calculates the third harmonic thw1 on the basis of the average value between the voltage command value of a maximum phase with a maximum duty ratio and the voltage command value of a minimum phase with a minimum duty ratio among the three-phase voltage command values va0, vb0, and vc0.

At step S5, the amplitude calculation unit 61 calculates the amplitude A of the three-phase voltage command values va0, vb0, and vc0.

At step S6, the gain calculation unit 62 calculates the correction gain G on the basis of the third harmonic thw1 and the amplitude A.

At step S7, the multiplier 63 multiplies the third harmonic thw1 by the correction gain G to calculate the corrected third harmonic thw2.

At step S8, the subtractor 64 corrects the three-phase voltage command values va0, vb0, and vc0 with the corrected third harmonic thw2 to calculate the corrected three-phase voltage command values va1, vb1, and vc1.

At step S9, the PWM control unit 46 and the inverter 47 drive the three-phase motor 20 on the basis of the corrected three-phase voltage command values va1, vb1, and vc1.

(Modifications)

(1) The third harmonic thw2 may be obtained on the basis of equation (9) below obtained by transforming equation (2) instead of equation (4) above.

[Math 7]

$$thw2 = -\frac{1}{2}A \sin \theta - \frac{\sqrt{3}}{2}A \cos \theta + \frac{\sqrt{3}}{2}A$$
$$= thw1 + \frac{\sqrt{3}}{2}A + \sqrt{3}\sqrt{\frac{A^2}{4thw1} - 1} \times thw1 \quad (9)$$

Figure 3C:
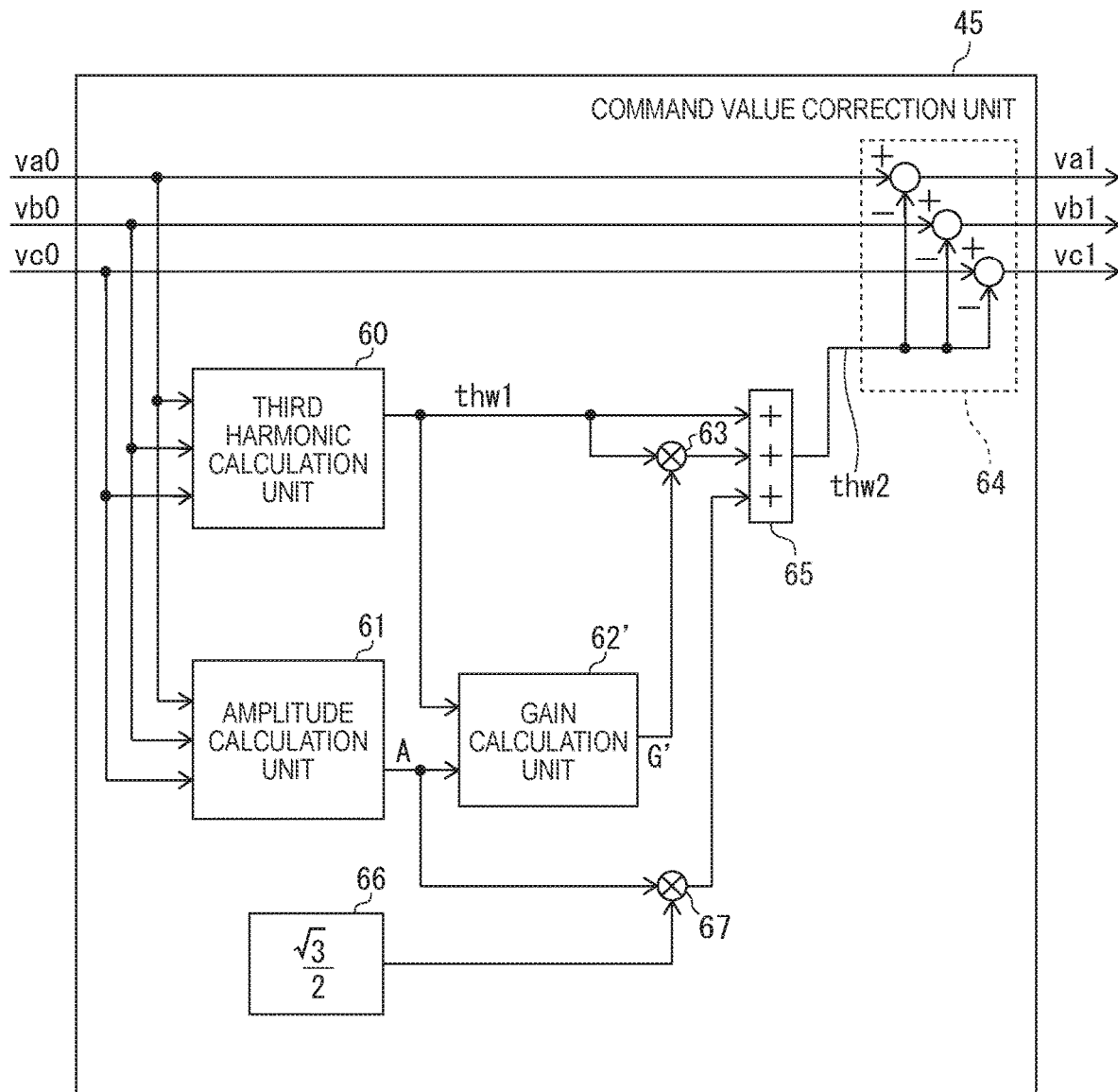
FIG. 3C is a block diagram illustrating another example of the functional structure of the command value correction unit illustrated in FIG. 2.

FIG. 3C illustrates an example of the functional structure of the command value correction unit 45 configured to calculate the third harmonic thw2 by calculation equation (9). The command value correction unit 45 includes the third harmonic calculation unit 60, the amplitude calculation unit 61, a gain calculation unit 62', the multiplier 63, an adder 65, a constant unit 66, and a multiplier 67. The gain calculation unit 62', the multiplier 63, the adder 65, the constant unit 66, and the multiplier 67 is an example of a "third harmonic conversion unit" described in the claims. The gain calculation unit 62' calculates a gain G° of the following equation.

[Math 8]

$$G' = \sqrt{3}\sqrt{\frac{A^2}{4thw1} - 1}$$

(2) Even when a harmonic is included in the three-phase voltage command values va0, vb0, and vc0, the command value correction unit 45 of the present embodiment can favorably flatten peak portions of the waveforms of the corrected three-phase voltage command values va1, vb1, and vc1 by appropriately selecting the constant C and the intercept β of equations (7) and (8) above according to the harmonic.

Accordingly, the current command value calculation unit 40, the subtractors 41 and 42, the PI control unit 43, and the two-phase/three-phase conversion unit 44 may generate the three-phase voltage command values va0, vb0, and vc0 including a harmonic.

On the other hand, in the technology of PTL 2 described above, the correction values of the three-phase voltage command values are calculated assuming that the three-phase voltage command values are sine waves. Therefore, the technology of PTL 2 is not applicable when the three-phase voltage command values va0, vb0, and vc0 include a harmonic.

Effects of First Embodiment (1) The current command value calculation unit 40, the subtractors 41 and 42, the PI control unit 43, and the two-phase/three-phase conversion unit 44 calculate the three-phase voltage command values va0, vb0, and vc0 to be applied to the three-phase motor 20. The third harmonic calculation unit 60 calculates the third harmonic thw1 on the basis of an average value between the voltage command value of a maximum phase with a maximum duty ratio and the voltage command value of a minimum phase with a minimum duty ratio among the three-phase voltage command values va0, vb0, and vc0. The amplitude calculation unit 61 calculates the amplitude A of the three-phase voltage command values va0, vb0, and vc0. The gain calculation unit 62 calculates the correction gain G on the basis of the third harmonic thw1 and the amplitude A.

The multiplier 63 multiplies the third harmonic thw1 by the correction gain G to calculate the corrected third harmonic thw2. The subtractor 64 subtracts the corrected third harmonic thw2 from the three-phase voltage command values va0, vb0, and vc0 to correct the three-phase voltage command values va0, vb0, and vc0 and calculate the corrected three-phase voltage command values va1, vb1, and vc1. The PWM control unit 46 and the inverter 47 drive the three-phase motor 20 on the basis of the corrected three-phase voltage command values va1, vb1, and vc1.

As described above, correcting the third harmonic thw1 into the corrected third harmonic thw2 mitigates an abrupt change point that occurs in the waveforms of the corrected three-phase voltage command values va1, vb1, and vc1, and reduces a duty ratio at which the waveforms of the voltage command values of two phases intersect.

(2) The corrected third harmonic thw2 may be a third harmonic having a component obtained by synthesizing amounts by which the three-phase voltage command values va0, vb0, and vc0 exceed √3/2 times the amplitude in each phase. Correcting with such a corrected third harmonic thw2 mitigates an abrupt change point that occurs in the waveforms of the corrected three-phase voltage command values va1, vb1, and vc1, and reduces a duty ratio at which the waveforms of the voltage command values of two phases intersect.

(3) The gain calculation unit 62 calculates a gain proportional to the third harmonic thw1 as the correction gain G. This facilitates calculation of the corrected third harmonic thw2.

(4) Even when a harmonic is included in the three-phase voltage command values va0, vb0, and vc0, a conversion equation can be obtained from the relationship between the third harmonic thw1 and the corrected third harmonic thw2. There can be calculated a corrected third harmonic thw2 suitable to the three-phase voltage command values including the harmonic.

Second Embodiment

The first embodiment has calculated, as the corrected third harmonic thw2, the third harmonic having the component obtained by synthesizing amounts by which the A phase, B phase, and C phase voltage command values va0, vb0, and vc0, respectively, exceed √3/2 times the amplitude. However, any other third harmonic may be calculated as the corrected third harmonic thw2.

For example, the corrected three-phase voltage command values va1, vb1, and vc1 of the first embodiment include higher order components than a third-order component, and the higher order components emerge at electrical angles of 60 degrees, 120 degrees, 180 degrees, 240 degrees, 300 degrees, and 360 degrees. Therefore, depending on frequency responsive characteristics of the inverter 47, it is not possible to respond to such higher order components, which may cause distortion in actual voltage waveforms.

Then, the command value correction unit 45 of a second embodiment calculates, for example, a corrected third harmonic thw2 that has a sine waveform or a cosine waveform having a frequency that is three times a fundamental frequency of the three-phase voltage command values va0, vb0, and vc0.

For example, the command value correction unit 45 of the second embodiment calculates a corrected third harmonic thw2 given by equation (10) below.

[Math 9]

$$thw2 = -\frac{A}{6} \times \sin 3\theta \quad (10)$$

With reference to FIG. 10, a comparison is made between waveforms after correcting the three-phase voltage command values with the corrected third harmonic thw2 of equation (10) above and waveforms after correcting them with the third harmonic thw1.

A solid line 90 indicates a waveform of the corrected third harmonic thw2 calculated by equation (10) above. Additionally, solid lines 91, 92, and 93 indicate waveforms of corrected A phase, B phase, and C phase voltage command values after having been corrected with the corrected third harmonic thw2 (the solid line 90).

The dashed and dotted line 74, the dashed and double dotted line 75, and the broken line 76 indicate the waveforms of the corrected A phase, B phase, and C phase voltage command values after having been corrected with the third harmonic thw1, as in FIG. 4.

Although peak portions of the waveforms 91, 92, and 93 of the voltage command values after having been corrected with the corrected third harmonic thw2 of equation (10) above are not completely flat, there occurs no abrupt change point as in the waveforms 74, 75, and 76 of the voltage command values corrected with the third harmonic thw1.

Furthermore, the corrected voltage command values include only the fundamental wave component included in the three-phase voltage command values va0, vb0, and vc0 and a third-order component included in the corrected third harmonic thw2, and include no higher-order components than that. This can avoid disadvantages caused by higher-order components than the third-order component.

An example of a method for calculating the corrected third harmonic thw2 of equation (10) above will be described below. A correction gain G=thw2/thw1 for correcting the third harmonic thw1 into the corrected third harmonic thw2 of equation (10) above can be calculated by equation (11) below.

[Math 10]

$$G = \frac{thw2}{thw1} = \frac{1}{3}\frac{\sin 3\theta}{\sin \theta} \quad (11)$$

When equation (1) above is solved for θ and the result is substituted into equation (11) above, equation (12) below including no variable θ is obtained.

[Math 11]

$$G = \frac{thw2}{thw1} = 1 - \frac{16}{3A^2}thw1^2 \quad (12)$$

In other words, the correction gain G is a quadratic function of the amplitude A of the three-phase voltage command values va0, vb0, and vc0 and the third harmonic thw1. The correction gain G is proportional to a squared value of the third harmonic thw1.

The gain calculation unit 62 of the second embodiment calculates the correction gain G on the basis of the amplitude A and the third harmonic thw1 according to equation (12) above.

Note that as compared to when calculating the corrected third harmonic thw2 by equation (10) above, calculating by equation (12) above provides an advantage that the corrected third harmonic thw2 can be calculated without using phase information θ of the three-phase voltage command values va0, vb0, and vc0.

For example, when driving the three-phase motor 20 by the inverter 47, phases of the waveforms of the voltage command values need to be advanced more than phases of current waveforms. Additionally, when performing weak field control, it is necessary to advance the phase of applied current.

Therefore, when calculating the corrected third harmonic thw2 by equation (10) above, the phase θ needs to be calculated in consideration of the amount of advance angle. However, calculating by equation (12) above allows the corrected third harmonic thw2 to be calculated regardless of the amount of advance angle.

Additionally, the first embodiment has calculated the correction gain G on the basis of equation (4) above or equations (7) and (8) above. The second embodiment has calculated the correction gain G on the basis of equation (12) above.

Instead of these, the command value correction unit 45 may include a table that stores the correction gain G calculated offline in advance and a gain reading unit that reads the correction gain G from the table according to the amplitude A and the third harmonic thw1.

In addition, equation (10) above can be transformed as shown in equation (13) below. Accordingly, the corrected third harmonic thw2 may be obtained by conversion by addition of a value obtained by multiplying a third power of the third harmonic thw1 by $16/(3A^2)$ and the third harmonic thw1.

[Math 12]

$$-\frac{A}{6} \times \sin 3\theta = thw1 - \frac{16}{3A^2} \times thw1^3 \quad (13)$$

Effects of Second Embodiment (1) The corrected third harmonic thw2 may be a sine wave having the frequency three times the frequency of the three-phase voltage command values va0, vb0, and vc0. Correcting with such a corrected third harmonic thw2 can avoid introduction of a higher order component than a third-order component into the corrected three-phase voltage command values va1, vb1, and vc1.

(2) The gain calculation unit 62 calculates a gain proportional to the squared value of the third harmonic thw1, as the correction gain G. This allows the correction gain G to be calculated regardless of the amount of advance angle in advance angle control.

REFERENCE SIGNS LIST

1: Steering wheel
2: Steering shaft
3: Speed reduction gear
4A, 4B: Universal joint
5: Pinion rack mechanism
6: Tie rod
10: Torque sensor
11: Ignition key
12: Vehicle speed sensor
14: Battery
20: Three-phase motor
30: Control unit
40: Current command value calculation unit
41: Subtractor
42: Subtractor
43: PI control unit
44: Two-phase/three-phase conversion unit
45: Command value correction unit
46: PWM control unit
47: Inverter
49: Angular velocity conversion unit
50, 51, 52: Current sensor
53: Rotation angle sensor
60a: Maximum value selection unit
60b: Minimum value selection unit 60c: Averaging unit
61: Amplitude calculation unit
62, 62': Gain calculation unit
62a: Gradient calculation unit
62b, 63, 67: Multiplier
62c, 65: Adder
64: Subtractor
66: Constant unit

The invention claimed is:

1. A motor control device comprising:
a voltage command value calculation unit configured to calculate three-phase voltage command values to be applied to a three-phase motor;
a third harmonic calculation unit configured to calculate a first third harmonic on a basis of an average value between a voltage command value of a maximum phase with a maximum duty ratio and a voltage command value of a minimum phase with a minimum duty ratio among the three-phase voltage command values;
an amplitude calculation unit configured to calculate an amplitude of the three-phase voltage command values;
a third harmonic conversion unit configured to convert the first third harmonic into a second third harmonic on a basis of the first third harmonic and the amplitude;
a correction unit configured to correct the three-phase voltage command values by subtracting the second third harmonic from the three-phase voltage command values; and
a drive circuit configured to drive the three-phase motor on a basis of the corrected three-phase voltage command values.

2. The motor control device according to claim 1, wherein the third harmonic conversion unit includes a gain calculation unit configured to calculate a correction gain on a basis of the first third harmonic and the amplitude and a multiplication unit configured to calculate the second third harmonic by multiplying the first third harmonic by the correction gain.

3. The motor control device according to claim 1, wherein the second third harmonic is equal to a component obtained by synthesizing amounts by which the three-phase voltage command values exceed $\sqrt{3}/2$ times the amplitude in each phase.

4. The motor control device according to claim 3, wherein the gain calculation unit calculates a gain proportional to the first third harmonic as the correction gain.

5. The motor control device according to claim 1, wherein the voltage command value calculation unit calculates the three-phase voltage command values including a harmonic.

6. The motor control device according to claim 1, wherein the second third harmonic is a sine wave or a cosine wave having a frequency that is three times a frequency of the three-phase voltage command values.

7. The motor control device according to claim 6 wherein the gain calculation unit calculates a gain proportional to a squared value of the first third harmonic as the correction gain.

8. An electric actuator product comprising the motor control device according to claim 1 and the three-phase motor controlled by the motor control device.

9. An electric power steering device comprising the motor control device according to claim 1 and the three-phase motor controlled by the motor control device, the three-phase motor applying a steering assist force to a steering system of a vehicle.

* * * * *